(12) United States Patent
Crohas et al.

(10) Patent No.: US 8,338,703 B2
(45) Date of Patent: Dec. 25, 2012

(54) HOUSING FOR AN ELECTRONIC DEVICE, DEVICE COMPRISING SUCH A HOUSING AND METHOD FOR MANUFACTURING SUCH A HOUSING

(75) Inventors: Henri Crohas, Verrieres le Buisson (FR); Damien Tronchere, Joy en Josas (FR)

(73) Assignee: Archos, Igny (FR)

( * ) Notice: Subject to any disclaimer, the term of this patent is extended or adjusted under 35 U.S.C. 154(b) by 205 days.

(21) Appl. No.: 12/767,980

(22) Filed: Apr. 27, 2010

(65) Prior Publication Data

US 2010/0270052 A1 Oct. 28, 2010

(30) Foreign Application Priority Data

Apr. 27, 2009 (WO) ................. PCT/FR2009/050773

(51) Int. Cl.
*H05K 5/00* (2006.01)
(52) U.S. Cl. ........... 174/50; 439/535; 248/906; 264/275
(58) Field of Classification Search .................... 174/50; 439/535; 248/906; 220/4.02; 264/275
See application file for complete search history.

(56) References Cited

U.S. PATENT DOCUMENTS

| 5,925,847 | A | 7/1999 | Rademacher et al. | |
| 6,439,927 | B1 | 8/2002 | Peter et al. | |
| 7,976,758 | B2 * | 7/2011 | Hsu et al. | 264/267 |
| 8,071,877 | B2 * | 12/2011 | Nakayama et al. | 174/50 |
| 2002/0021549 | A1 | 2/2002 | Kono et al. | |

FOREIGN PATENT DOCUMENTS

| DE | 43 22 753 A1 | 1/1995 |
| DE | 198 30 227 A1 | 1/2000 |
| EP | 0633585 A1 | 1/1995 |

OTHER PUBLICATIONS

International Search Report in Corresponding Application No. PCT/FR2009/050773 Dated Jan. 18, 2010.

* cited by examiner

*Primary Examiner* — Dhirubhai R Patel
(74) *Attorney, Agent, or Firm* — Young & Thompson

(57) ABSTRACT

A housing (1) for an electronic device, includes at least a front part (2) and a back part (3) adapted to be assembled together, defining an internal volume (5) capable of receiving functional components of the device. At least one of the front (2) and/or back (3) parts contains at least one insert (7; 7'; 8) produced from a first material, in particular sheet metal, integrated by overmoulding, into a frame (9; 10) produced from a second material, in particular plastic material or injectable metal. The housing is applicable to the field of electronic devices, such as telephones, multimedia players/recorders, portable computers, "tablet" type computers, external computer screens, television sets, etc.

20 Claims, 6 Drawing Sheets

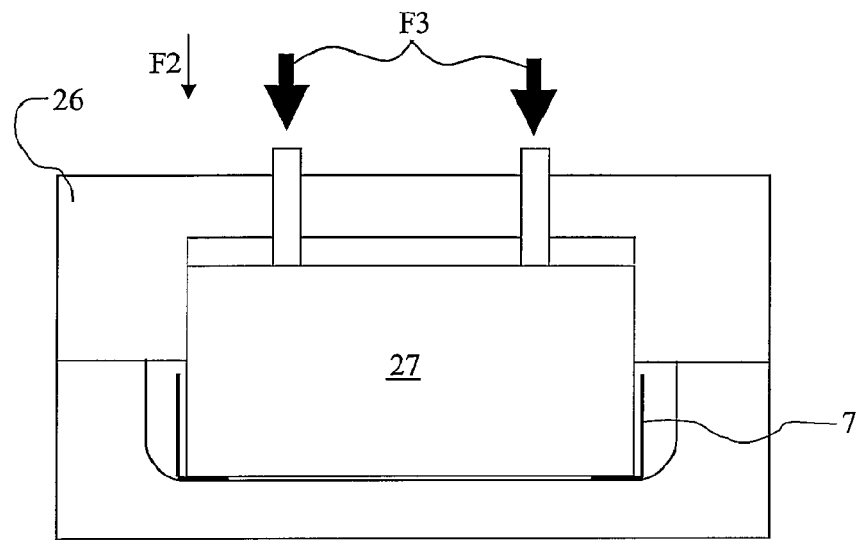
FIG. 10
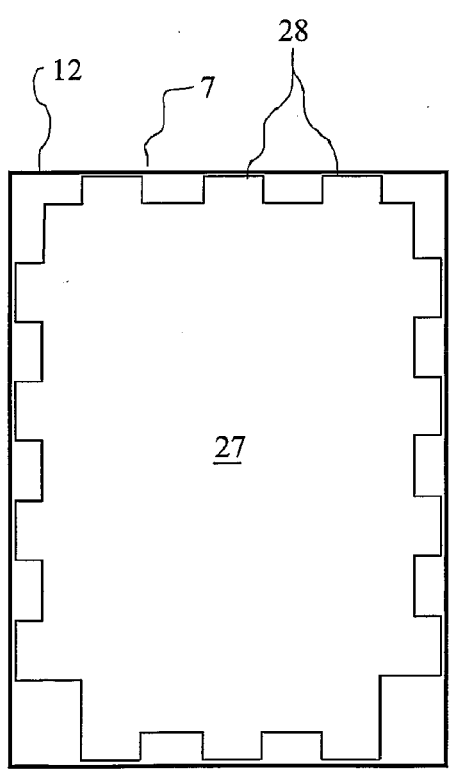
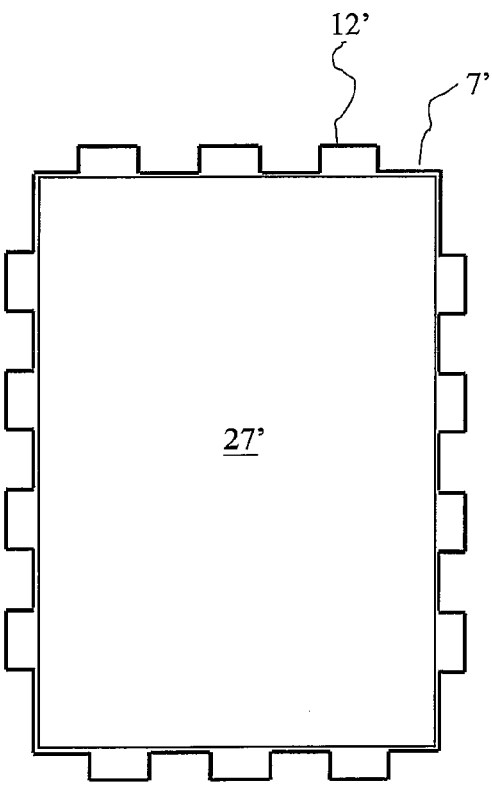
FIG. 11  FIG. 12

HOUSING FOR AN ELECTRONIC DEVICE, DEVICE COMPRISING SUCH A HOUSING AND METHOD FOR MANUFACTURING SUCH A HOUSING

BACKGROUND OF THE INVENTION

The invention relates to the field of electronic devices of any size, in particular devices comprising a screen, such as telephones, multimedia players and/or recorders, portable computers, "tablet" type computers, television sets, etc.

Manufacturers of electronic devices are constantly looking to reduce the size of the devices in each of their dimensions, in particular their thickness. They are also seeking to make the surfaces of the elements constituting the front face of the devices approximately coplanar. Moreover, manufacturers are looking for solutions to reduce costs both in terms of materials costs and in terms of manufacturing costs.

Solutions that make it possible to obtain a streamlined appearance and maximize the surface of the screen on the front face are particularly sought after. This relates to portable electronic devices but also to non-portable devices such as for example computer screens and flat-screen television sets designed to be mounted on a wall, which can reach sizes of 40 diagonal inches and more.

Standard solutions for producing housings from plastic material are known, these result in thick housings. Solutions are also known for producing housings from sheet metal or also from injected metal, these result in relatively expensive housings and require non-standard solutions to make the surfaces of the screen and front face coplanar. Patent application US 2004/102230 moreover discloses a solution using elements made of plastic material and metal elements. The known combined solutions are complicated to implement and expensive in terms of equipment.

SUMMARY OF THE INVENTION

The aim of the present invention is to at least partially rectify the problems not solved by the known solutions, by proposing a housing, a method for manufacturing it and a system formed of a housing according to the invention and a screen.

To this end, a subject of the invention is a housing for an electronic device, comprising at least a front part and a back part which are adapted to be assembled together, defining an internal volume capable of holding functional components of the device, characterized in that at least one of the front and/or back parts contains at least one insert produced from a first material, in particular sheet metal, integrated, by overmoulding, into a frame produced from a second material, in particular plastic material or injectable metal.

The invention is thus based on the combined use of sheet metal and plastic material in order to produce composite parts within the framework of a method for manufacturing by overmoulding with solid interpenetration of the metal parts.

The invention allows a synergetic combination of the best characteristics of the parts made of organic plastic materials, or metal, produced by moulding, and those contributed by metal in sheet form. The invention provides for close cooperation between plastic materials and metal, materials that are heterogeneous by nature, allowing exceptional characteristics to be obtained, in particular in terms of reduction of material for a given stiffness. The invention is based on an overmoulding of the metal parts which is arranged so as to provide high cohesion between the materials. Although the means which procure the results have nothing in common, the invention bears certain analogies to reinforced concrete. This analogy makes it possible for certain advantages of the invention to be appreciated intuitively. To achieve the objective of a high cohesion between the heterogeneous materials, the invention provides for a large number of points of interpenetration on the metal parts, where the plastic material penetrates during the overmoulding.

The main advantages of the moulded material in the context of use of the invention are the ease with which complex shapes can be obtained and the functional capabilities of these shapes inside the housing, for example to secure or fasten inner sub-assemblies such as a hard disk, a screen, one or more batteries, one or more printed circuits, etc. Another important advantage of plastic material is its transparency to radio waves, which makes it possible for it to contain aerials. Another advantage is the relatively low cost of this plastic material. The use of non-magnetic and/or non-ferrous alloys is compatible with certain types of aerials.

The contribution of metal in the field of portable electronic devices is particularly beneficial for improving the quality perceived by the user, and for usefully contributing to shielding the electronics and, where appropriate, the efficiency of the aerials by constituting large earth planes.

The invention aims to make the most of the respective advantages of each material and to add thereto those resulting from the joint implementation according to the invention.

The presence of at least one large metal surface in the composite housing according to the invention is also advantageous for the better dissipation of the heat produced inside the device. For certain devices in which electronic components have to be in contact with a heat sink, the addition of an interface piece with a low thermal resistance between the surface of the components concerned and a metal part of the composite housing according to the invention makes it possible to perform the task at a lower cost.

The advantages of the invention are also significant from the point of view of the resulting look and feel. The housing resulting from the implementation of the method according to the invention makes it possible to directly obtain a perfect visual line in particular at the boundaries, in particular in the fit and outcrops between the outer metal surfaces and those made of plastic material.

According to further advantageous characteristics of the invention, the insert contains a face emerging onto the outside of the housing, so as to constitute part of the outer skin of the housing.

According to yet further advantageous characteristics of the invention, adjacent areas of the insert and the frame are arranged approximately flush, in particular coplanar.

According to yet further advantageous characteristics of the invention, the insert contains a peripheral rim folded by approximately 90°, forming an angle to a flat central region.

According to yet further advantageous characteristics of the invention, the insert contains perforations and/or notches located on the peripheral rim, passed through at least partially by the second material, for example made of plastic, coming from the frame from an outer side of the housing towards its internal volume.

According to yet further advantageous characteristics of the invention, the perforations and/or notches each have an opening surface approximately equal to that of a hole with a diameter comprised between 0.5 and 3 mm, for example of the order of 1 mm.

According to yet further advantageous characteristics of the invention, the perforations and/or notches are distributed approximately homogeneously on the peripheral rim of the insert.

According to yet further advantageous characteristics of the invention, the front and back parts are fixed by screws and/or clips, in particular by clipping at least one openwork plate, for example made of metal, coming from the insert of one of the front or back parts, to a lug of the housing, for example a lug coming from the frame of the other part.

According to yet further advantageous characteristics of the invention, the front and back parts contain centering stops and/or ribs which are adapted to ensure a contiguous assembly of their adjacent peripheral edges.

According to yet further advantageous characteristics of the invention, the insert has a thickness of less than 0.5 mm, for example comprised between 0.1 and 0.5 mm.

According to yet further advantageous characteristics of the invention, the insert has a rectangular general shape, of which the external dimensions, short and long sides, are greater than three quarters of the corresponding external dimensions of the front or back part supporting said insert.

A further subject of the invention is an electronic device, in particular a portable device of the single-piece type, i.e. without a jointed part, comprising a housing having all or some of the preceding characteristics, the front part containing a first insert provided with a window intended in particular to border a screen and the back part containing a second insert forming the back face of the device.

A subject of the invention is also an electronic device, in particular a portable device having a flip form or folding screen, commonly called "clamshell" type, i.e. with parts hinged together, comprising a first housing, supporting for example a screen, hinged onto a second housing supporting for example a keyboard, at least one of said first and second housings having all or some of the preceding characteristics.

According to further advantageous characteristics of the invention, the device comprises a damping pad, in particular made of elastomer, resting on a solid inner component of the device and cooperating in contact with one of the inserts so as to prevent or attenuate the vibrations of the latter during operation of the device.

According to yet further advantageous characteristics of the invention, the device comprises actuating means, in particular of the piezoelectric type, which make it possible to cause one of the inserts to operate as a diaphragm of an electroacoustic transducer from set-point data emitted by an internal component of the device.

A further subject of the invention is a method for manufacturing a housing having all or some of the preceding characteristics, the method comprising the following steps:
  obtaining the insert, for example made of metal, in particular produced by a method involving the steps of cutting, drawing, punching, folding, etc.
  positioning the insert in an open mould,
  using a floating core so as to exert a force on the insert, the latter thus being held pressed against a support surface of the mould,
  closing the mould,
  injecting the second material, for example the plastic material, into the mould.

Of course, a subsequent stage of ejecting the finished piece(s) is provided for at the end of the injection and after a cooling phase.

The invention moreover makes it possible to simplify and reduce the assembly operations. In fact, the invention makes it possible in a single operation to produce housing half-shells ready for final assembly. To this end, the method according to the invention uses pre-decorated sheets and coloured plastic materials in the mix in an appropriate manner and including, where appropriate, the functional elements. Specific surface treatments of the inside of the moulds can also be implemented in order to create effects aiming for example at toning down or accentuating the contrast between the metal surfaces and the surfaces made of plastic material. Of course, it is possible to add a finishing stage, consisting for example in painting the whole of the composite piece, without exceeding the scope of the invention.

According to further advantageous characteristics of the invention, the floating core is set into the insert, between peripheral rims of the latter forming angles of approximately 90° to a flat central area of the insert, the core comprising peripheral slots defining the injected material, for example made of plastic, in slots corresponding to the projections of the insert.

According to yet further advantageous characteristics of the invention, the floating core is set into the insert, between peripheral rims of the latter forming on the one hand angles of approximately 90° to a flat central area of the insert, and on the other hand slots defining the injected material, for example made of plastic, in slots corresponding to the projections of the insert.

BRIEF DESCRIPTION OF THE DRAWINGS

Other advantages and characteristics of the invention will become apparent on examination of the detailed description of an embodiment which is in no way limitative, and the attached diagrams, in which:

FIG. 10 represents means for the process of injection of the housing of FIG. 1, illustrating the use of a floating core intended to hold the metal insert in position, FIGS. 11 and 12 illustrate diagrammatic views, along the arrow F2, of the insert and of the floating core according to two embodiments of the method according to the invention, illustrating the respective peripheral profiles of the insert and the floating core making it possible to shape and define the penetration of the plastic material on the projections of the peripheral rim of the insert.

DESCRIPTION OF PREFERRED EMBODIMENTS.

Figure 1:
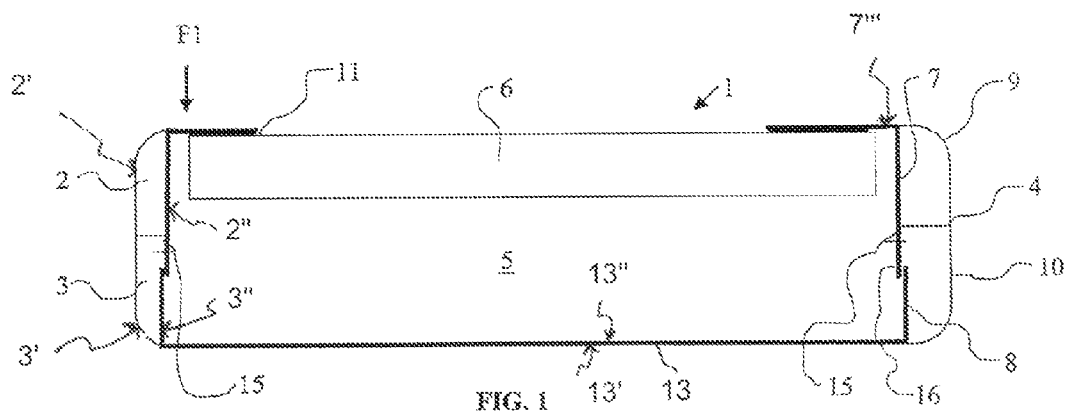
FIG. 1 represents a diagrammatic view, in transverse or longitudinal section, of an electronic device provided with a housing according to the invention.

FIG. 1 shows a multimedia electronic device comprising a housing provided with two half-shells 2 and 3, arranged in order to be assembled by their mating surface 4 and fixed, defining an internal volume 5 intended to receive the functional elements of the device. For the sake of clarity of the illustration, the functional components of the device 1 are not shown, with the exception of a screen 6.

The "front 2" and "back 3" parts will also be mentioned in the following disclosure, with reference to the half-shells also corresponding to the upper and lower faces of the device.

According to an essential aspect of the invention, at least one of the front 2 and/or back 3 parts contains at least one corresponding insert 7, 8 produced from a first material, the insert being integrated by overmoulding into a corresponding frame 9, 10, produced from a second material that is different from the first. The front 2 includes external side 2' and internal side 2" and the back 3 includes external side 3' and internal side 3". The insert 7 includes an external face 7'". Internal sides 2" and 3" define the internal volume 5.

In the description that follows, an embodiment will be described which uses an insert produced from sheet metal and a frame produced from a plastic material. More widely, and while remaining within the scope of the invention, the insert can be produced from a steel, or any other metal or metal alloy having a high melting temperature, for example at a melting temperature of steel. The second material is an organic material or also a metal or a metal alloy having a lower melting temperature than the first material, for example a melting temperature of a magnesium type metal or a Zamak type alloy. An essential aspect of the invention consists of injecting the second material into a mould, at a temperature lower than the melting temperature of the insert.

Figure 4:
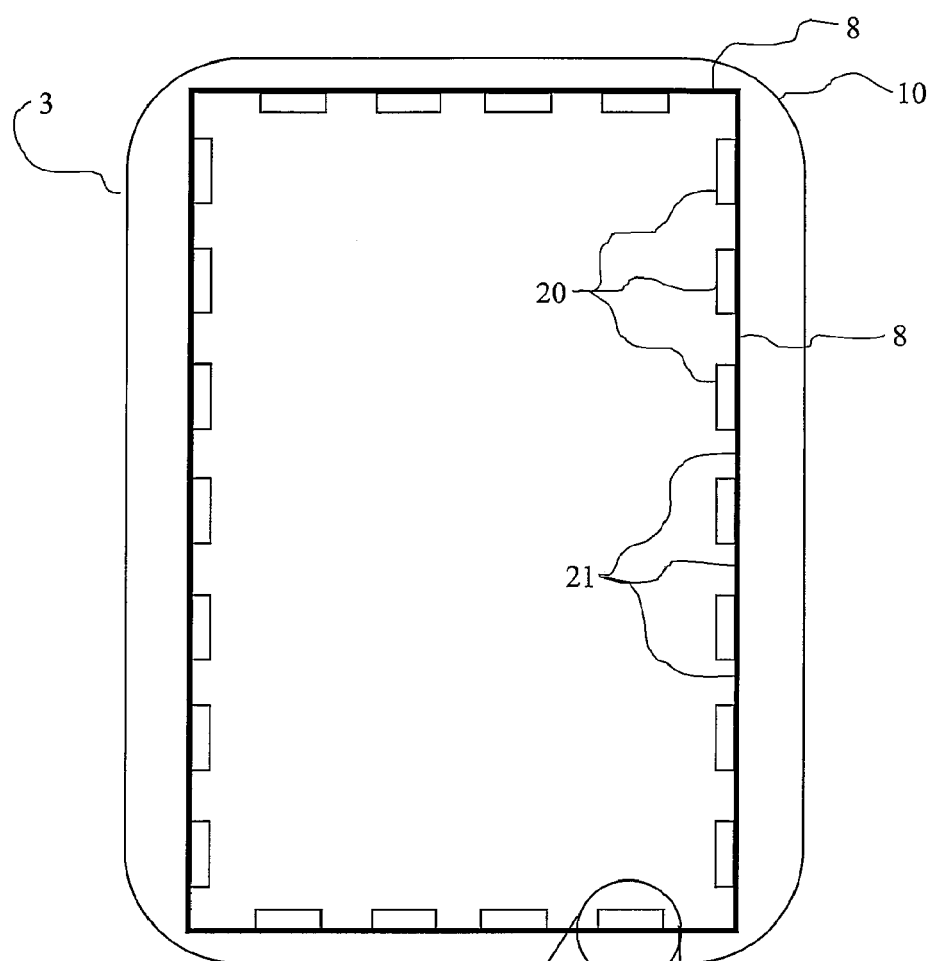
FIG. 4 is a plan view, along the arrow F, of the housing of the device of FIG. 1, in particular a half-shell constituting it.

In the example illustrated in FIG. 1, the front 2 and back 3 part each contain an insert 7, 8 integrated into its respective frame 9, 10. The insert 7 of the front part 2 contains a central window 11 intended to border the screen 6. The insert 8 of the back part 3 is solid and includes a part 13 with external face 13' and internal face 13". The faces 7'" and 13' extend at least to an external skin (2'+3'+13'+7'") of the housing (1) and constituting part of the external skin of the housing. In the example illustrated in FIG. 4, representing the back part 3 of the device, the insert 8 has a rectangular shape covering the bulk of the outer surface of the lower face of the back part 3. It is noted that the insert forms part of the external skin (2', 3', 13' and 7'") of the device and thus has an appearance and finish which are engineered as a function of the desired look and feel (decoration, inscription, brushed metal appearance, etc.).

In their joining area located on the outer side of the device, the insert 7, 8 and the frame 9, 10 have surfaces that are tangential to each other, so as to have a continuous outer surface that is perfectly flush between the insert 7, 8 and the corresponding frame 9, 10. Thus there can be a perfect coplanarity between the insert 7, 8 and the frame 9, 10 on the upper and lower faces of the device 1 (FIG. 1).

The insert is produced from a sheet element having a thickness of less than 0.5 mm, for example from 0.1 to 0.5 mm. A thickness of this size makes it possible to minimize the materials cost of the metal. A sheet as thin as this does not necessarily provide, as it is, the sought-after robustness characteristics. Constituting a housing-screen system as a whole provides stiffness and durability via perfect flatness. The screen module bonded at the periphery on the lower face of the sheet framing provides the necessary stiffness. The thus-constituted housing-screen system offers, in its entirety, the expected mechanical characteristics such as in the case of the chassis of modern automobiles where the necessary stiffness is obtained after bonding the glass surfaces on the sheet.

Figure 3:
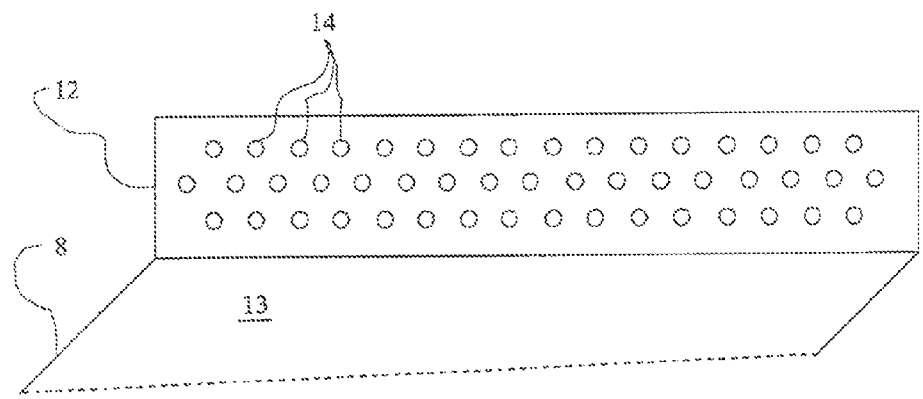
FIG. 3 is a perspective view of portion of an insert made of sheet metal of the housing of FIG. 1, illustrating the peripheral rim in the form of an angle.

With reference to FIG. 3, it is noted that each insert 7, 8 contains a peripheral rim 12 folded by approximately 90° forming an angle to a flat central region 13. The control of the dimensional characteristics of an injected metal-plastic composite housing a small quantity of material is complicated in that the stresses exerted in the plastic material naturally tend to deform the sheet metal. In order to reduce the impact of the contraction phenomena, it is necessary to create stiffening capabilities for the metal part. The stiffening capabilities are advantageously provided by these peripheral rims 12 forming angles. This solution is particularly advantageous in that it encroaches only very little into the internal volume of the housing which can thus be used almost entirely to contain the functional components of the device (electronics, accumulator batteries, etc.). Thus the invention makes the best possible use of the internal volume of the housing.

The invention provides for increasing the number of points of attachment between the insert 7, 8 and its frame 9 by surrounding/penetrating/interlinking metal parts during the overmoulding. This makes it possible to definitively prevent the likelihood of relative movement of the plastic parts in relation to the metal parts and to strengthen the cohesion of the assembly of heterogeneous materials. As can be seen in FIG. 3, multiple perforations 14 in the overmoulded metal insert 8, which are preferably positioned in the peripheral rim 12 forming an angle, are provided for. The distribution of the perforations and their combined opening surface are determined in order to avoid the appearance of visible shrink marks at the level of the perforations in the sheet on the outer surfaces having an aesthetic role. In the overmoulding areas, it will be preferred to increase the number of perforations having a small combined surface and to distribute them equally, for example in staggered rows as illustrated in FIG. 3, to enhance the cohesion of the assembly. However, it is necessary that the perforations have a minimal combined surface in order that the plastic material penetrates well through these openings. A homogeneous distribution of several perforations having a small combined surface moreover offers the advantage of not reducing the strength of the metal parts. The minimal combined surface of the perforations depends on the characteristics of the plastic material and on its implementation conditions such as injection pressure, temperature of the material, temperature of the mould, etc. In an embodiment of the invention, the combined opening surface is approximately equal to that of a hole with a diameter comprised between 0.5 and 3 mm. A diameter of the order of 1 mm is appropriate for example. The perforations can have any shape, or even consist only of simple punctures, without exceeding the scope of the invention.

In an embodiment variant, the perforations can be replaced or supplemented by notches. Moreover, several lines of perforations can be envisaged, as represented in FIG. 3; however, it is also possible to provide, in a variant, that a single perforation line be provided for.

Figure 2:
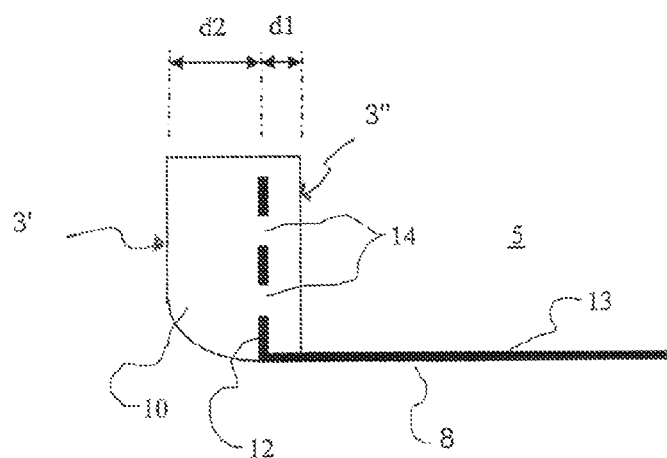
FIG. 2 is a partial diagrammatic view, along the arrow F1, of a production detail of the housing of the device of FIG. 1, in particular a half-shell constituting it.
Figure 5:
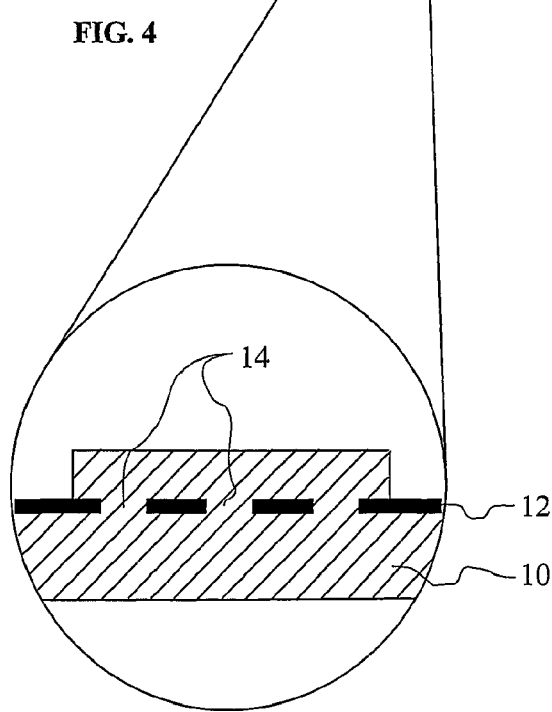
FIG. 5 is an enlarged view of a production detail of FIG. 4, illustrating the interpenetration of the metal insert by plastic material coming from the frame by means of injection.

It is also specified, with reference to FIGS. 2 and 5, that the penetration of the plastic material through the perforations is performed from the outside of the peripheral rim towards the internal volume 5 of the housing, this penetration consisting in an overflow of the plastic material into the internal volume with a dimension d1 less than the thickness of the plastic material d2 of the outer side of the peripheral rim 12. The dimensions d1 and d2 are considered along the normal to the plane of the peripheral rim 12, and are, by way of example, comprised between 0.2 and 0.5 mm for d1, and comprised between 0.6 and 1.3 mm for d2. These examples of values are given purely as an illustration for products with relatively small dimensions (for example portable multimedia devices). These dimensions can be increased, for products with larger dimensions, without necessarily exceeding the scope of the invention.

Whatever the first material and the second material used respectively for the insert and the frame, the multiple perforations and notches are arranged and calibrated so as to guarantee that the injection of the second material penetrates fully into them in order to produce an effective anchorage and a perfect integration of the interface areas between the elements.

Moreover, the assembly and fixing of the front 2 and back 3 parts is provided by fastening means such as screws and/or clips. For example screw fixings can be used when these last can be screwed into fastening bodies or also into holes made in a sufficiently thick part in a portion of the piece produced from plastic material. The scope of the invention is not exceeded if the parts are fastened together entirely by screws or based solely on clips.

Figure 6:
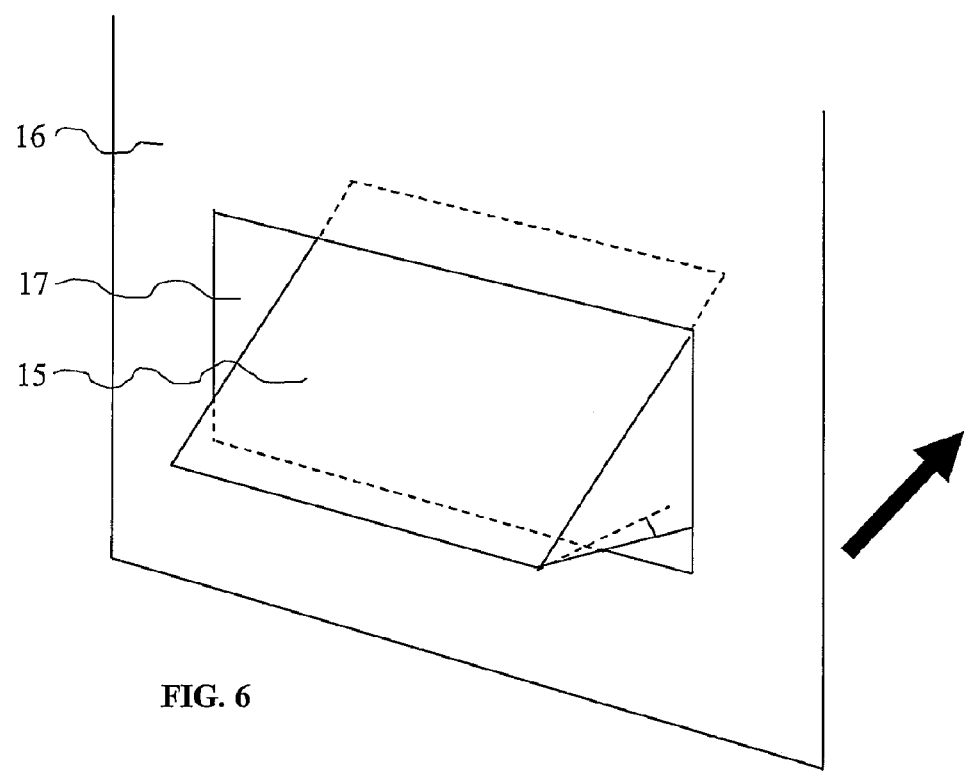
FIG. 6 represents a perspective view of a detail of the means of fastening by clipping of the half-shells constituting the housing of FIG. 1.

Clips are particularly advantageous in that they can be increased in number without undue expense. Increasing the number of fixation points is useful for enhancing the stiffness of the assembly, the straightness of the mating surface 4 between the front 2 and back 3 parts (FIG. 1). In a particularly advantageous embodiment, illustrated in FIGS. 1 and 6, the fasteners are based on assemblies comprising clip onto receiving clips produced from different materials. In other words, a lug 15 originating from the plastic frame 10 of one 3 of the half-shells cooperates, by clipping, with a metal tongue 16 originating from the insert 7 of the other half-shell 2 (tongue forming an extension of the peripheral rim), the metal tongue 16 containing a cut-out window 17 receiving a projecting edge of the lug 15. This example is based on the fact that it is relatively simple to mould a volumetric piece made of plastic material and relatively simple to cut a window in a sheet. The advantages are a better control of the chain of dimensions compared with a solution of clipping metal on metal. A better solidity and less jamming than a solution of clipping plastic on plastic.

Figure 7:
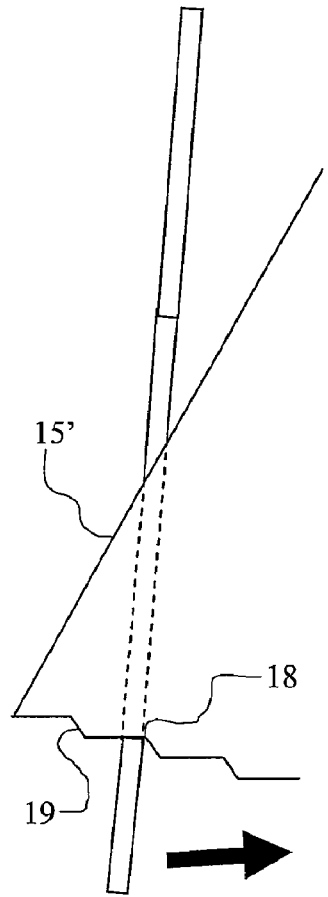
FIG. 7 represents a variant of the means of fastening by clipping of FIG. 6.

In a still more advantageous embodiment, the plastic lug has, facing the edge of the cutout 18 in the sheet tongue on which it rests, a surface that is inclined in such a way that, with the restoring force originating from the elasticity of one and/or the other of the two parts of the clipping solution, an approximately perpendicular force is exerted, tending to keep the mating surfaces in contact. This refinement of the invention makes it possible to compensate for possible dimensional variations of the pieces during or after manufacture. In a still more preferred variant, illustrated in FIG. 7, producing said inclined surface 19 of the lug 15' in stages is provided for. The support surface of each step in the thickness of the cutout 18 in the other piece is parallel to the direction of the force which results from the elasticity of one and/or the other of the two parts of the clipping solution. During the assembly of the pieces, a pressure is applied on the pieces until the mating surfaces come into contact at all points. While this pressure is being exerted, each clip will engage in the corresponding window and settle on the appropriate plateau in order to keep the assembly joined after the application of the forces needed for assembly has ceased.

In an embodiment variant, not represented, of the invention, the first part and the second part can be assembled and fixed together not directly, but via one or more intermediate piece(s). In this case, the fixation lug can come from one of these intermediate pieces.

Advantageously, stops and/or inner ribs 20 can be added to prevent the edges of the half-shells 2, 3, which normally abut and form a flat angle, from opening or forming an angle which is no longer flat in the case of excessive tightening of the fastening means (FIG. 4). These ribs 20 constitute means of centering and/or indexing during the assembly of the half-shells 9, 10. These ribs constitute extensions beyond the mating surface 4 of the plastic material of one of the half-shells 9, 10, and penetrating at least partially into the other half-shell 9-10. In relation to the insert 7, 8, these ribs 20 are located on the side of the internal volume 5 of the housing and have as a base the plastic material which has protruded through the perforations 14 or notches. Thus the metal insert 7, 8 is embedded locally in the plastic material.

It is provided that the mating surface between the half-shells is not necessarily continuous and/or coplanar. Thus, certain implementation variants provide for discontinuities of the mating surface in order to arrange passages for buttons and/or indicator lights.

It can be provided that the ribs 20 are continuous along the peripheral edge 12 of the insert. However, a preferred embodiment, illustrated in FIG. 4, consists of providing periodic interruptions 21 of the plastic material leaving the metal insert 8 exposed locally, in order to decrease the stresses which tend to deform the metal.

It is provided that the housing according to the invention contains additional functional elements which are directly related thereto.

- at least one aerial element (metal sub-assembly, printed circuit, etc.), this type of element being directly related to the housing according to the invention in that the positioning and/or the characteristics of the at least one aerial element takes into account the earth plane(s) constituted by the metal parts of the housing and/or fixation points of the elements in a part made of plastic material.
- light guides for conveying the light emitted by sources such as LEDs positioned at points, advantageous in technical and/or economic terms, on a printed circuit towards return points, advantageous in terms of ergonomics and/or aesthetics, on the housing, etc.

In a particularly advantageous implementation variant of the invention, these functional elements can be incorporated into the housing during moulding, in the form of additional steps in the method.

The invention also provides for taking into account or making good use of the particular vibratory characteristics of the insert 7, 8.

Figure 8:
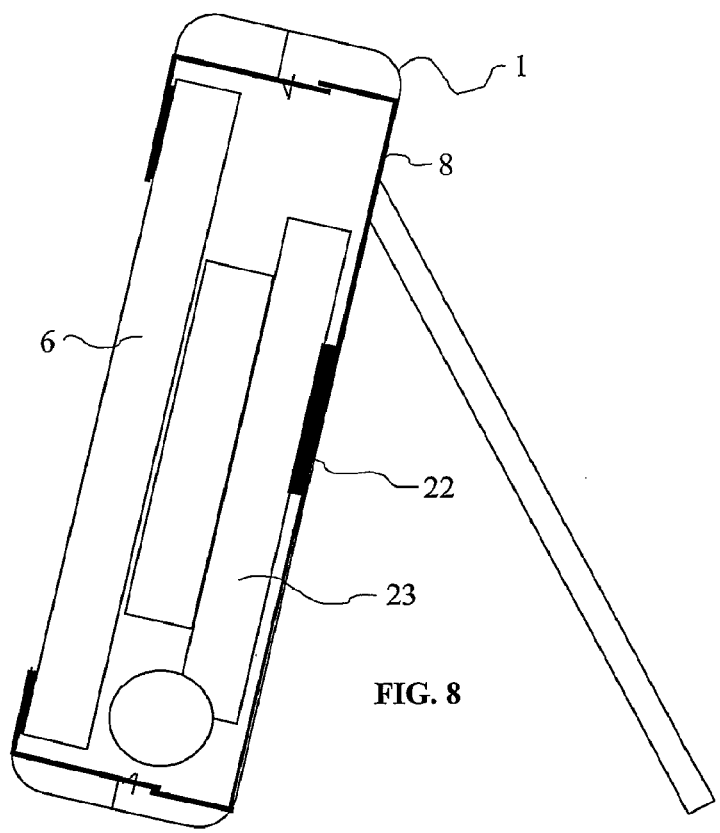
FIG. 8 represents a side view of a device according to the invention provided with a pad for damping vibrations that is in contact with the metal insert.

In fact, a housing according to the invention has a back face with a relatively large surface area produced from a sheet with a small thickness which will inevitably vibrate. Thus, the affixing of a damping pad 22, for example made of elastomer or any other appropriate material, resting on a solid inner component 23 of the device 1, is provided for in a first implementation variant of the invention (FIG. 8). The pad 22 can be bonded using an adhesive foam or a low-adhesion mastic glue, in order to allow subsequent dismantling. Said damping material is arranged to create a mechanical bond at least one point of the surface of said back face and a surface of a solid inner element 23, for example accumulator batteries or also a mass storage sub-assembly of the hard disk type, in order to prevent the start of intrusive unwanted vibrations of the back face when a loudspeaker is implemented inside the housing in order to reproduce acoustic data. If there is no mechanical bond between the solid internal parts and at least one point of the back face, intrusive vibrations are likely to occur during the reproduction of low frequencies or at certain frequencies corresponding to modes of vibration of the housing. The addition of an appropriate material in order to create a continuity between the internal parts and the back face moreover allows, where appropriate, a better discharge of heat and an improvement in the stiffness which contributes to the perception of a solid feel that users associate with quality.

Figure 9:
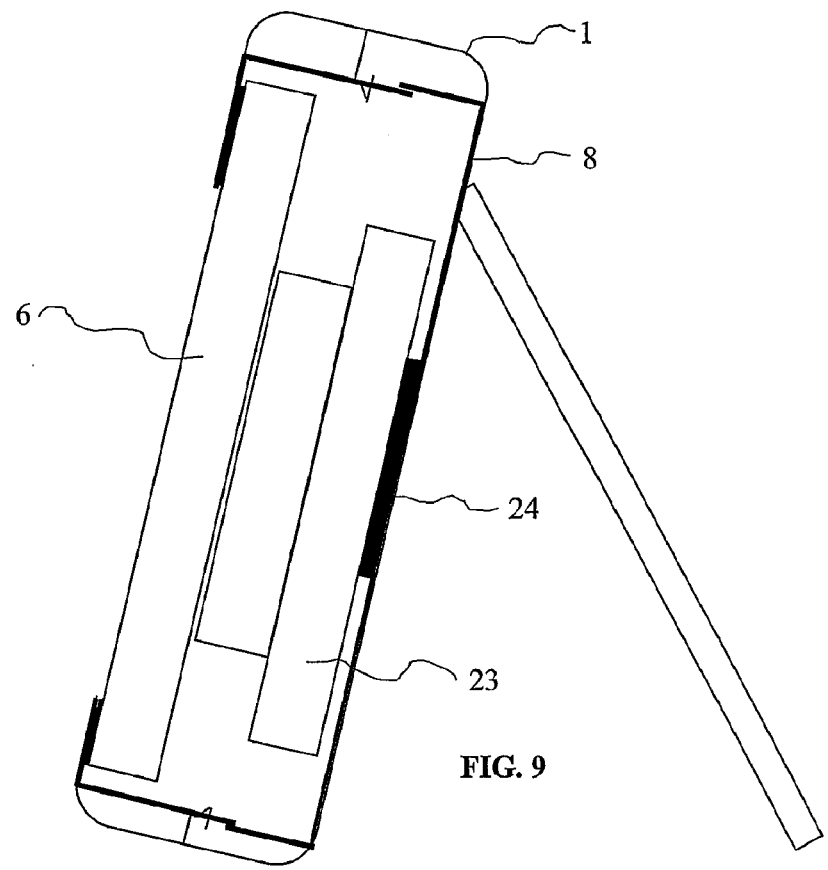
FIG. 9 represents a side view of a device according to the invention provided with an actuating means, of the piezoelectric type, which make it possible to cause the metal insert to operate as a diaphragm of an electroacoustic transducer.

In a second implementation variant of the invention relating to the acoustics (FIG. 9), it is provided for the back face of a housing according to the invention to be used as a diaphragm to reproduce acoustic data. Taking account of its thinness and its surface, the metal back face of a housing according to the invention can potentially be used as a diaphragm of an electroacoustic transducer. In this use of the back face of the housing according to the invention the production of an electroacoustic transducer in free vibration is provided for. To this end, it is provided for example that a piezoelectric material 24, equipped with appropriate electrodes for making the sheet vibrate, be bonded onto the back face. The advantage of a piezoelectric solution is its small thickness and the absence of a magnetic field which could pose problems close to a file memory of the hard disk type. Another embodiment provided consists of being no longer in free vibration but in controlled movement relative to a fixed internal reference. In the case of a piezoelectric actuator, the difference between the two variants can consist in fixing the back of the actuator onto at least one point of support on a solid element 23 or rigidly linking it to the other rigid parts of the housing. Of course, any other type of actuator such as for example an actuator based on magnetism can be used without exceeding the scope of the invention. The invention moreover provides for appropriate signal processing in order to improve the perceived sound quality. In fact, the sheet 8 of the back face of the housing is not designed principally to serve as a loud-speaker diaphragm. The response curve can be strongly nonlinear and particular modes of vibration can produce a sound of insufficient quality. The solution to this problem that is provided for in the invention is to process the signal by digital means such as a digital signal processor (DSP) generally implemented in modern electronic devices to decode the signal that is stored or received in digital form. The parametering of the additional processing is specific to a housing model according to the invention in order to compensate for the shortcomings of the reproduction using the back face of the housing. It is provided that, in certain devices having a microphone, an optional combined linearization process is proposed to the user in order to perfect the reproduction quality.

Figure 13:
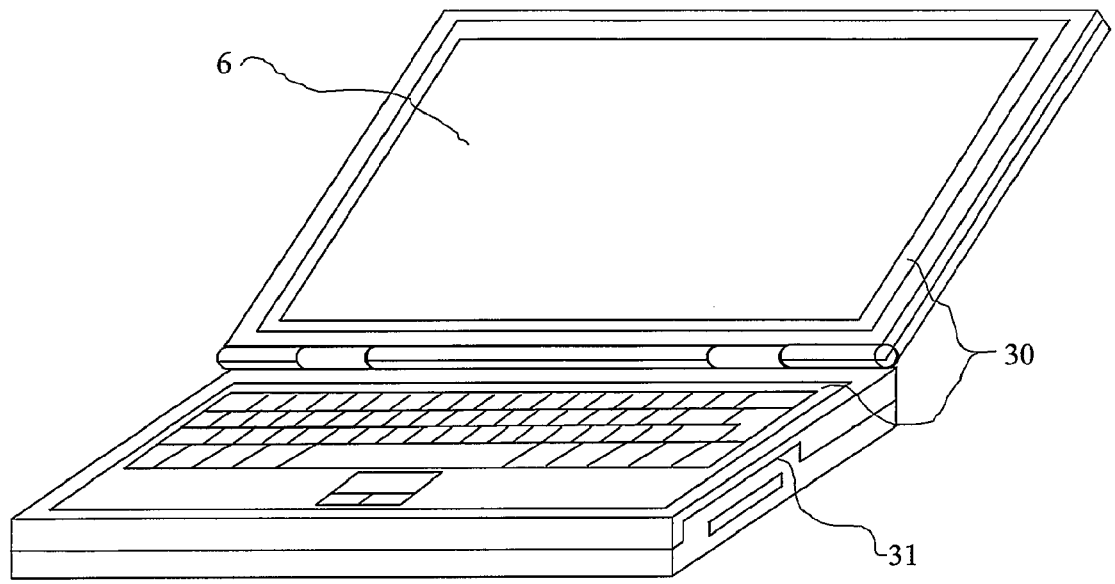
FIG. 13 represents an example implementation of the invention for producing a portable computer with a small thickness.

The implementation of the invention is particularly effective for reducing the thicknesses of computer housings. In a portable computer with a folding screen such as illustrated by FIG. 13, the invention allows a significant saving in thickness compared with the solutions of the state of the art both for the screen part and for the bottom part comprising the keyboard. The visible part of the metal inserts according to the invention 30 is found bordering the screen, keyboard and touchpad. This figure moreover illustrates an example of a mating surface between the two half-shells which are not in line with a continuous plane 31.

Figure 14:
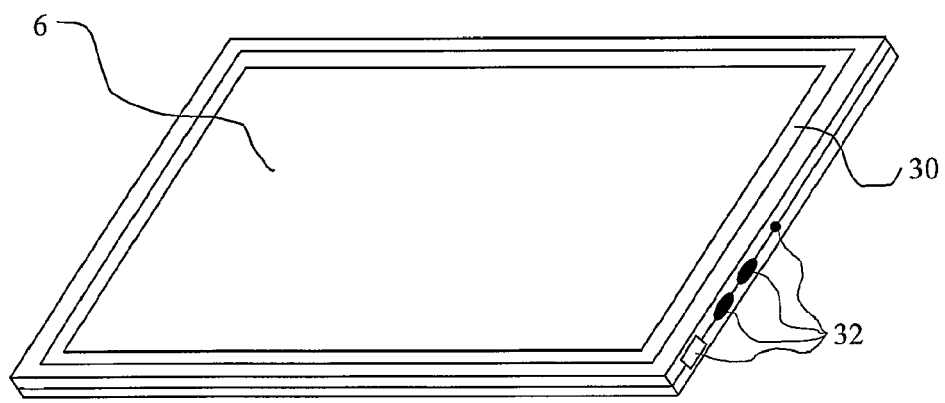
FIG. 14 represents an example implementation of the invention for producing a portable computer of the "tablet" type that is particularly thin.

FIG. 14 illustrates the implementation of the invention within the framework of devices having a form factor of the "tablet" type. These can be devices of all types and all screen sizes, for example from a few diagonal inches for portable devices to 40 inches in the case of "flat panel" television sets. This figure also illustrates an example of discontinuities in the mating surface for easily positioning buttons, connectors, warning lights 32 or all other means requiring an access to the outside. These can be ventilation inlets if appropriate.

The method for manufacturing a housing for an electronic device according to the invention is based on the use of a floating core 27 in the mould 26. By floating core is meant a mobile piece which forms part of the mould and the main function of which is to pin, with the necessary force, the metal insert 7 against a support surface at the bottom of the mould 26 in order that this insert 7 remains in place during the injection and cooling cycle of the plastic material. The floating core 27 can be integral with part of the mould and be guided in translational movement in the direction of application of the holding force of the metal piece 7 along the arrow F3. This holding force can be created by one or more springs which rest on the part of the mould with which the core is integral and which benefit from the exerted force in order to close the mould. The holding force can also be created by one or more cylinders specifically associated with the actuation of said floating core.

The steps of the method according to the invention are as follows:
  obtaining the metal insert 7, 8, in particular production by a method involving the steps of cutting, drawing, punching, folding, etc.
  positioning the insert 7, 8 in an open mould 26,
  using a floating core 27 so as to exert a constraint on the insert 7, 8, the latter thus being held pressed against a support surface of the mould 26,
  closing the mould 26,
  injecting the plastic material into the mould 26.

Of course, a subsequent step of ejecting the finished piece(s) is provided for at the end of the injection and after a cooling phase.

The metal insert is obtained in metal foils or sheets with a thickness comprised between 0.1 and 0.5 mm. The metal piece can be produced by any method or by any combination of methods which can comprise for example cutting, drawing, punching, folding, etc.

According to a first embodiment variant of the core 27 (FIG. 11), this is set into the metal insert 7, between peripheral rims of the latter forming angles of approximately 90° to a flat central area of the insert 7, the core 27 containing, on its periphery, slots 28 defining the plastic material in slots corresponding to the projections of the insert 7. The peripheral rim 12 of the insert 7 is straight in this case. According to another embodiment variant (FIG. 12), the core 27' is set into the metal insert 7', between peripheral rims of the latter forming angles of approximately 90° and an outer profile in slots 29 also defining the plastic material in slots corresponding to the projections of the insert 7'. The floating core 27' has straight edges in this case.

It is noted that this makes it possible:
  to have a constant thickness of plastic on the visible edge of the piece.
  to reduce the deformation stresses due to the withdrawal, creating periodic breaks in the continuity of presence of the plastic material on the inner wall that is not shown in order to decrease the stresses (due to the contraction during the cooling of the plastic material).
  to keep plastic on the inner wall despite the small thickness of the inner side in order to obtain a good "riveting" phenomenon which is needed to obtain a lasting cohesion between the materials.

As regards the actual plastic injection, the temperature of the equipment is for example of the order of 90° C. The cycle time is longer than in the case of moulding a piece made exclusively of plastic material because the method according to the invention requires:

time for heating the metal piece. This makes possible a good plastic-metal adherence and makes it possible to obtain a non-brittle plastic.

keeping under pressure during the cooling in order to prevent shrinkage.

The parameters of the moulding such as the different temperatures and the cycle times are the result of compromise and can be adapted in particular depending on the characteristics of the plastic material. The scope of the invention is not exceeded by modifying any particular parameter relative to the values given by way of a non-limitative example.

Further particulars of the method are:

a fluid material making it possible to produce thin walls and capable of passing into openings having small surface areas (perforations, notches) arranged in the insert to be overmoulded in order to obtain a perfect cohesion of the materials of different types.

a floating core making it possible to hold the sheet pressed against the equipment and to prevent the material from passing under the sheet under the effect of pressure. This makes it possible to obtain a continuity of the surfaces of different types, without flashes and with parting lines that are visually perfect without requiring subsequent reworking.

an insert made of a thin sheet with a thickness of less than 0.5 mm perforations or notches distributed over the whole surface area of the sheet in order to have a good metal/plastic attachment. The diameters of the holes are of the order of 0.5 to 1.2 mm, for example of the order of 1 mm in order to avoid shrink marks in the plastic material, which are particularly visible when a shiny finish is chosen for the parts made of plastic material.

Of course, the scope of the invention is not exceeded if, instead of a mould making it possible to produce one housing according to the invention per cycle, a mould with multiple cavities and floating cores is used in order to produce a plurality of housings according to the invention per cycle.

It is noted that the electronic device according to the invention can be of multiple types, without exceeding the scope of the invention, since the device contains at least a single housing or one hinged to another housing, one of these housings containing at least one front or back part provided with an overmoulded metal insert according to the characteristics and modalities defined previously. Non-limitative examples of electronic devices targeted by the invention are:

single-piece flip or slide phone,
   multimedia player/recorder, single-piece or with moveable parts,
   portable computer with a folding screen,
   computer of the "tablet" type,
   external computer screen
   television set.

Depending on the type of device, it will be possible for example to have only a front or back part, i.e. a single face constituted by an overmoulded metal insert. As a variant, it will be possible to have the two faces of the same device each provided with an overmoulded metal insert. As a variant, it will also be possible, in the case of a device comprising several mutually moveable parts (computer with a folding screen or other device which can be used according to the same principle), to have one, two, three or four faces of the device each provided with an overmoulded metal insert.

Moreover, in the preceding description, a device comprising a first insert 7 provided with a central window for a screen and a second insert 8 forming the back face of the device has been presented. The invention applies in the same manner, whatever the combination of shapes or dimensions of the inserts on a single device. An insert can equally well be provided around a screen, a keyboard (tactile or not), a control means of the "touchpad" type, etc.

Of course, the invention is not limited to the examples which have just been described, a number of developments can be added to it, other choices of combinations of characteristics and/or implementation can be made without exceeding the scope of the invention. Moreover, the example solutions or technical standards mentioned are those which are current at the time of filing the patent application. They are likely to disappear or be rapidly replaced by others without necessarily making the invention itself obsolete.

For example, whilst the use of sheet metals with a thickness of less than 0.5 mm is preferred within the framework of the implementation of the method for producing housings according to the invention suitable for small devices, the production of a housing according to the invention for devices comprising screens of a large size such as television sets or computer screens can require sheets with a thickness of more than 0.5 mm. This is true in particular for encapsulating screen faceplates having a large mass. In this case, a sheet thickness comprised between 0.5 and 2 mm can be appropriate.

The invention claimed is:

1. A housing (1) for an electronic device, comprising:
    a front part (2) and a back part (3) having sides (2", 3") and that are adapted to be assembled together to define an internal volume (5) capable of receiving functional components of the device,
    wherein at least one of the front (2) and back (3) parts contains an insert (7; 7'; 8) produced from a first material integrated, by overmolding, into a frame (9; 10) produced from a second material, the insert (7; 7'; 8) containing a face (7''', 13') extending at least to an external skin (2'+3'+13'+7''') of the housing (1) and constituting part of the external skin of the housing (1).

2. The housing according to claim 1, wherein adjacent zones of the insert (7; 7'; 8) and the frame (9; 10) are coplanar.

3. The housing according to claim 2, wherein the insert (7; 7'; 8) contains a peripheral rim (12) folded by approximately 90°, forming an angle to a flat central region (13).

4. The housing according to claim 1, wherein the insert (7; 7'; 8) contains a peripheral rim (12) folded by approximately 90°, forming an angle to a flat central region (13).

5. The housing according to claim 4, wherein the insert (7; 7'; 8) contains perforations (14) and/or notches located on the peripheral rim (12), passed through at least in part by the second material coming from the frame (9; 10) from an outer side of the housing (1) towards the internal volume (5).

6. The housing according to claim 5, wherein the perforations (14) and/or notches each have an opening surface approximately equal to that of a hole having a diameter comprised between 0.5 and 3 mm.

7. The housing according to claim 6, wherein the perforations (14) and/or notches are distributed approximately homogeneously on the peripheral rim (12) of the insert (7; 7'; 8).

8. The housing according to claim 5, wherein the perforations (14) and/or notches are distributed approximately homogeneously on the peripheral rim (12) of the insert (7; 7'; 8).

9. The housing according to claim 1, wherein the front (2) and back (3) parts are fixed by screws and/or clips coming from the insert (7; 7'; 8) of one of the front (2) or back (3) parts, to a lug (15; 15') of the housing (1).

10. The housing according to claim 1, wherein the front (2) and back (3) parts contain centering stops and/or ribs (20) which are adapted to ensure a joint assembly of their adjacent peripheral edges.

11. The housing according to claim 1, wherein the insert (7; 7'; 8) has a thickness between 0.1 and 0.5 mm.

12. The housing according to claim 1, wherein the insert (7; 7'; 8) has a rectangular general shape, of which the external dimensions, short and long sides, are greater than three quarters of the corresponding external dimensions of the front (2) or back (3) part supporting said insert (7; 7'; 8).

13. An electronic device comprising the housing (1) according to claim 1, wherein the front part (2) contains a first said insert (7) provided with a window (11) intended to border a functional component of the device, and the back part (3) containing a second said insert (8) forming a back of the device.

14. The electronic device according to claim 13, further comprising a damping pad (22) resting on a solid internal component (23) of the device and cooperating in contact with one of the inserts (7; 7'; 8) so as to prevent or attenuate the vibrations of the latter during operation of the device.

15. The electronic device according to claim 13, further comprising actuating means (24) for causing one of the inserts (7; 7'; 8) to operate as a diaphragm of an electroacoustic transducer from set-point data emitted by an internal component of the device.

16. An electronic device comprising a first housing supporting a screen and hinged on a second housing supporting a keyboard, wherein at least one of said first and second housings is the housing (1) according to claim 1.

17. The electronic device according to claim 16, further comprising a damping pad (22) resting on a solid internal component (23) of the device and cooperating in contact with one of the inserts (7; 7'; 8) so as to prevent or attenuate the vibrations of the latter during operation of the device.

18. A method for manufacturing the housing according to claim 1, comprising the following steps:
    obtaining the insert (7; 7'; 8) by a method involving steps including at least one of cutting, drawing, punching, and folding the first material,
    positioning the insert (7; 7'; 8) in an open mold (26),
    using a floating core (27; 27') so as to exert a constraint on the insert (7; 7'; 8), the latter thus being held pressed against a support surface of the mold (26),
    closing the mold (26), and
    injecting the second material into the mold (26).

19. The method according to claim 18, wherein the floating core (27) is set into the insert (7), between peripheral rims (12) of the latter forming angles of approximately 90° to a flat central zone of the insert (7), the core (27) comprising peripheral slots (28) defining the injected material in slots corresponding to the projections of the insert (7).

20. The method according to claim 18, wherein the floating core (27') is set into the insert (7'), between peripheral rims (12') of the latter forming angles of approximately 90° to a flat central zone of the insert (7'), and slots defining the injected material in slots corresponding to the projections of the insert (7').

* * * * *